Figure 1:
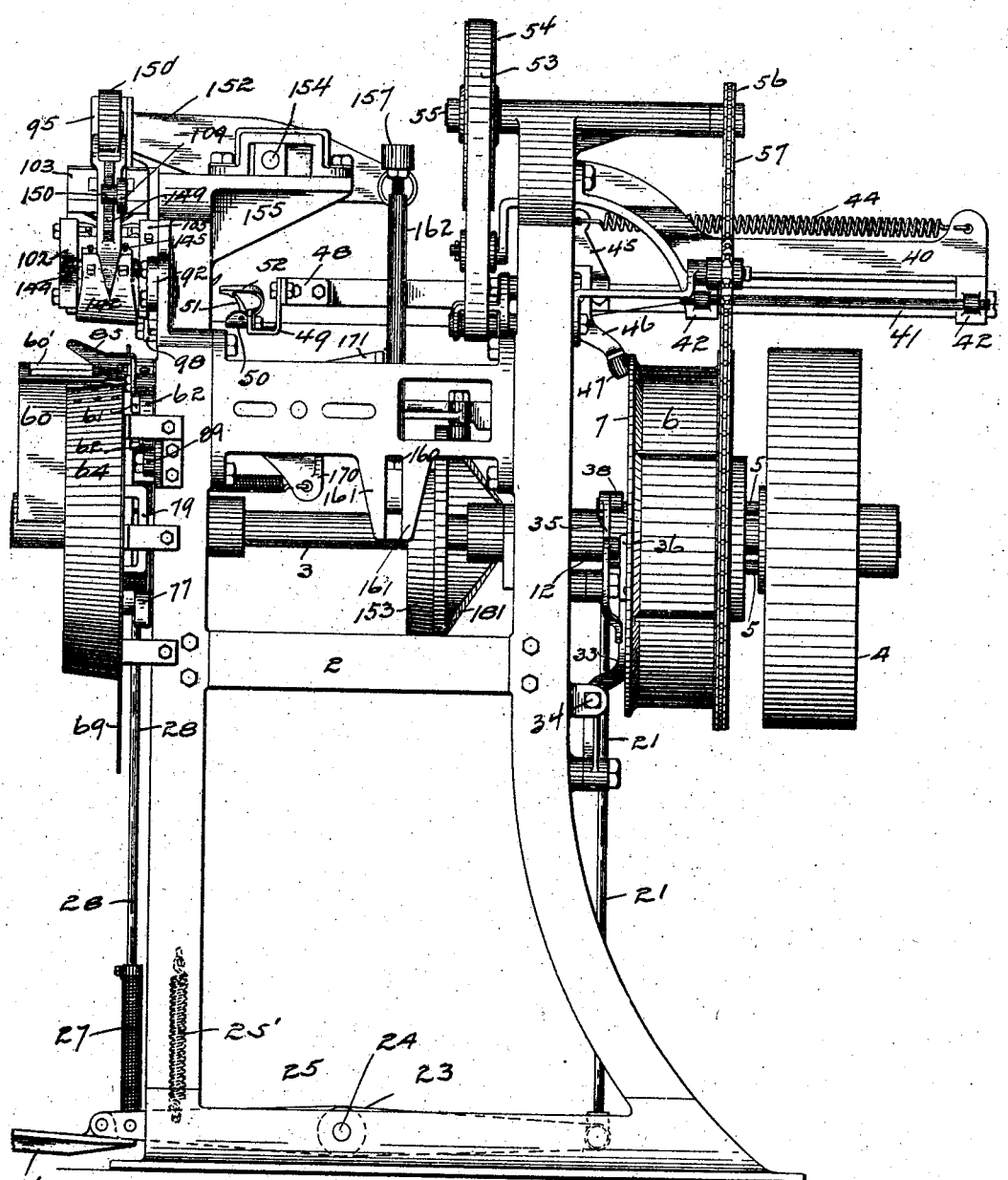

No. 815,835. PATENTED MAR. 20, 1906.
J. G. IVERSON.
MACHINE FOR SIZING BARREL HOOPS AND SECURING THE ENDS THEREOF.
APPLICATION FILED MAY 4, 1904.

15 SHEETS—SHEET 1.

WITNESSES
INVENTOR
JOHN G. IVERSON
BY Paul & Paul
HIS ATTORNEYS

No. 815,835. PATENTED MAR. 20, 1906
J. G. IVERSON.
MACHINE FOR SIZING BARREL HOOPS AND SECURING THE ENDS THEREOF.
APPLICATION FILED MAY 4, 1904.

15 SHEETS—SHEET 2

WITNESSES

INVENTOR
JOHN G. IVERSON
BY Paul & Paul
HIS ATTORNEYS

No. 815,835. PATENTED MAR. 20, 1906.
J. G. IVERSON.
MACHINE FOR SIZING BARREL HOOPS AND SECURING THE ENDS THEREOF.
APPLICATION FILED MAY 4, 1904.
15 SHEETS—SHEET 3.
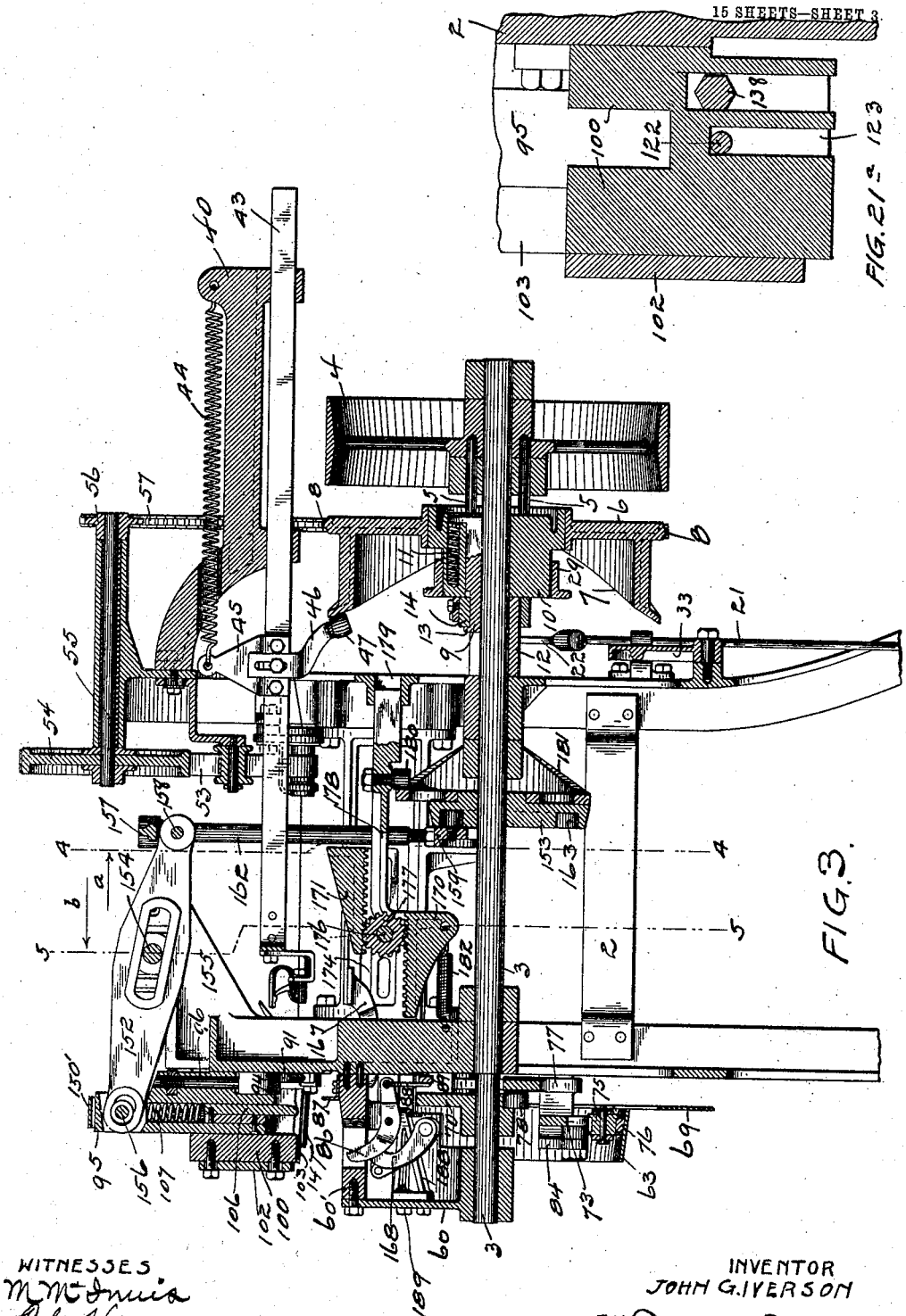
WITNESSES
INVENTOR
JOHN G. IVERSON
BY Paul & Paul
HIS ATTORNEYS No. 815,835. PATENTED MAR. 20, 1906.
J. G. IVERSON.
MACHINE FOR SIZING BARREL HOOPS AND SECURING THE ENDS THEREOF.
APPLICATION FILED MAY 4, 1904.
15 SHEETS—SHEET 4.
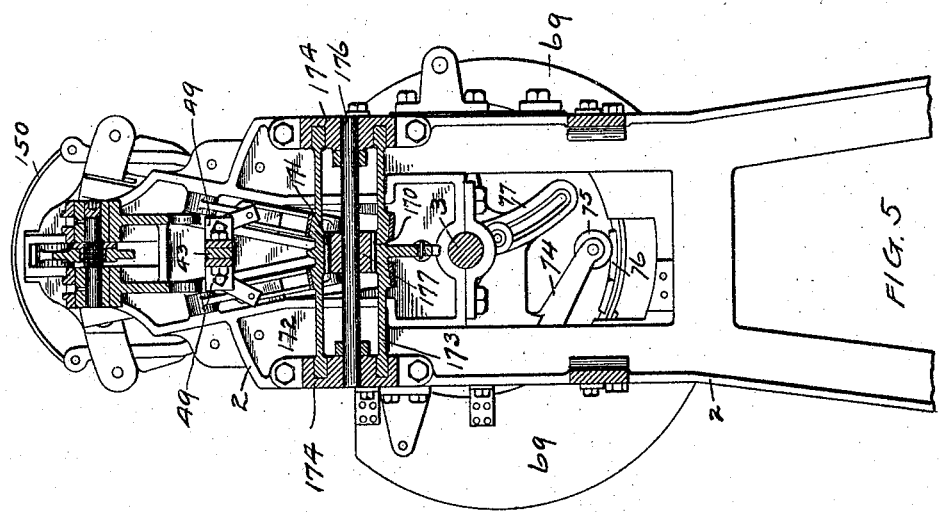
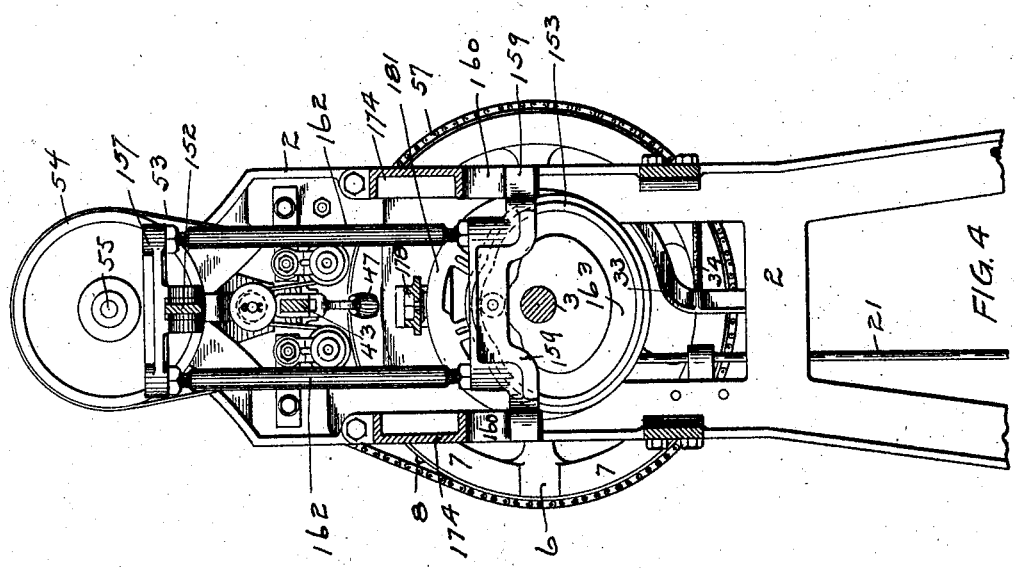
WITNESSES
INVENTOR
JOHN G. IVERSON
BY Paul & Paul
HIS ATTORNEYS No. 815,835. PATENTED MAR. 20, 1906.
J. G. IVERSON.
MACHINE FOR SIZING BARREL HOOPS AND SECURING THE ENDS THEREOF.
APPLICATION FILED MAY 4, 1904.

15 SHEETS—SHEET 5.

WITNESSES
INVENTOR
JOHN G. IVERSON
BY Paul & Paul
HIS ATTORNEYS

No. 815,835. PATENTED MAR. 20, 1906.
J. G. IVERSON.
MACHINE FOR SIZING BARREL HOOPS AND SECURING THE ENDS THEREOF.
APPLICATION FILED MAY 4, 1904.

15 SHEETS—SHEET 6.

WITNESSES

INVENTOR
JOHN G. IVERSON
BY Paul & Paul
HIS ATTORNEYS

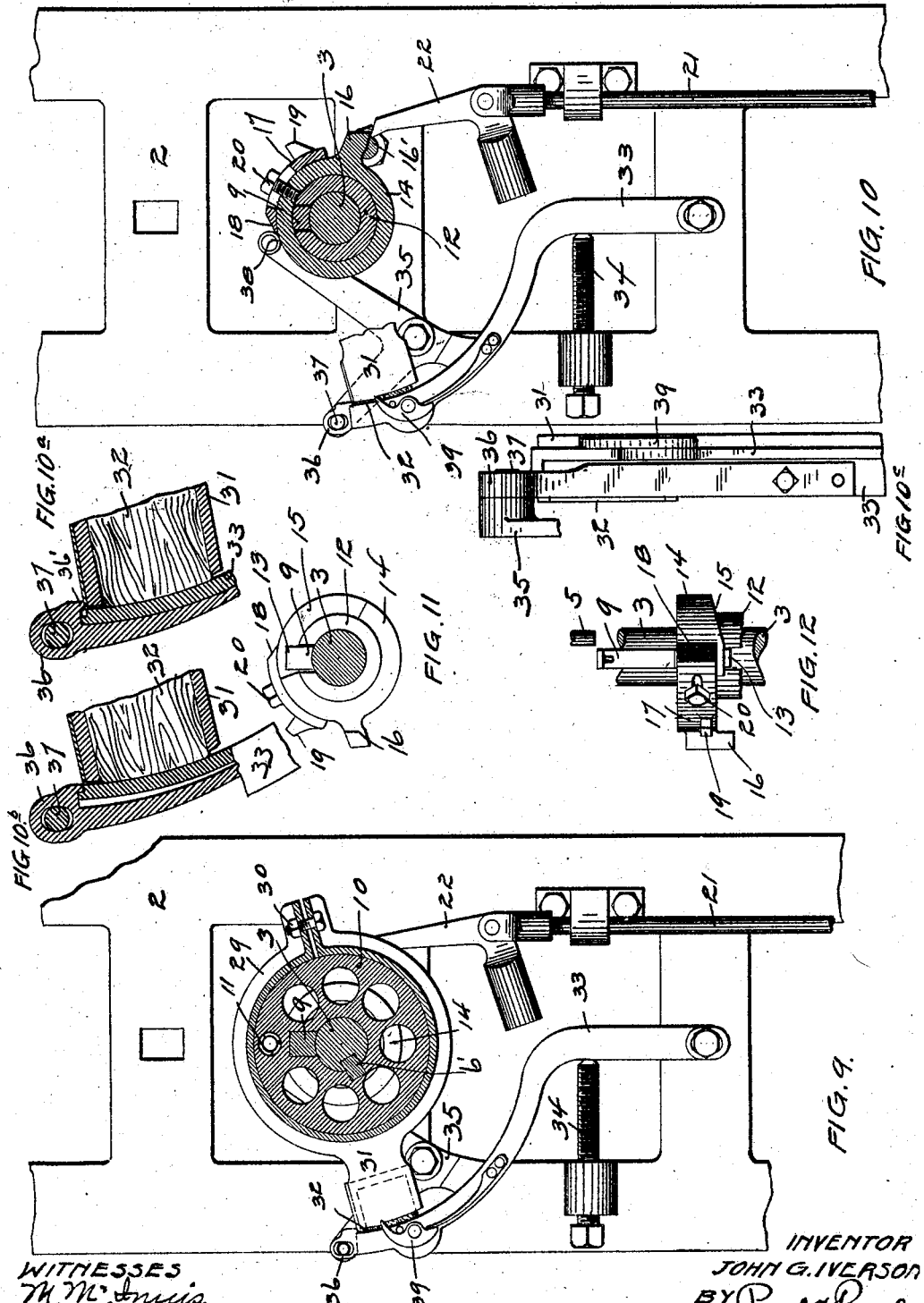

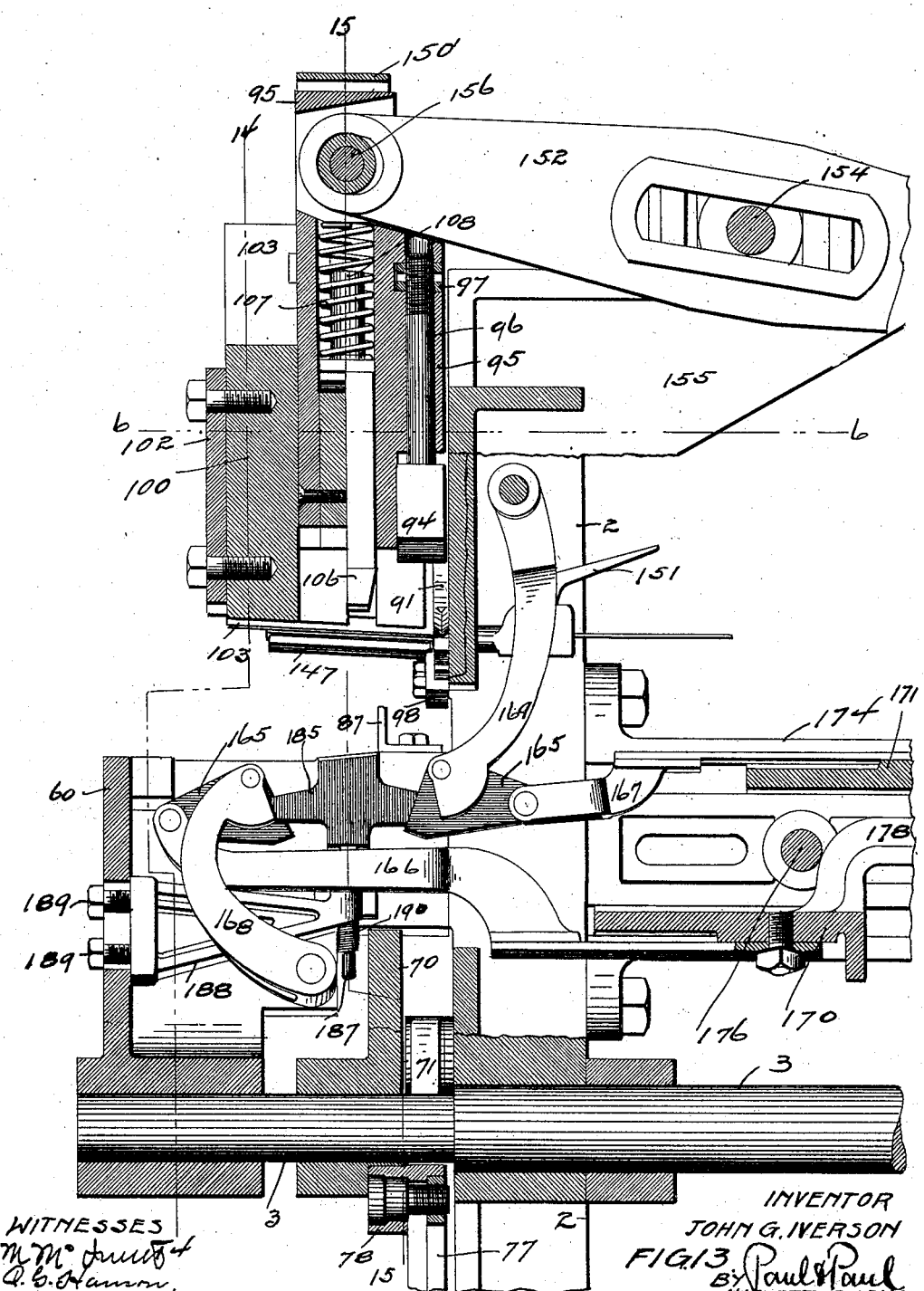

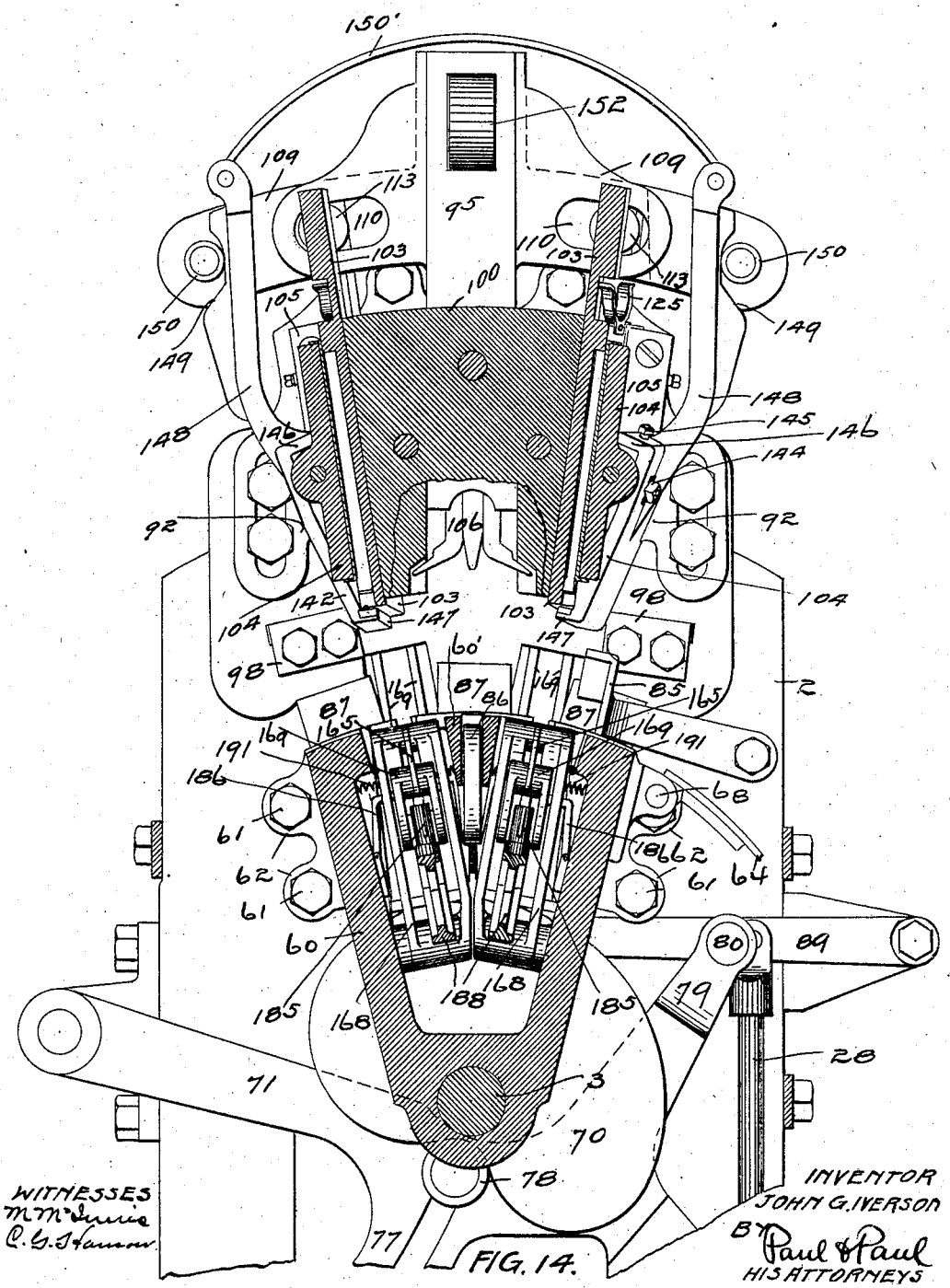

No. 815,835. PATENTED MAR. 20, 1906.
J. G. IVERSON.
MACHINE FOR SIZING BARREL HOOPS AND SECURING THE ENDS THEREOF.
APPLICATION FILED MAY 4, 1904.

15 SHEETS—SHEET 10.

WITNESSES

INVENTOR
JOHN G. IVERSON
BY
Paul & Paul
HIS ATTORNEYS

No. 815,835. PATENTED MAR. 20, 1906.
J. G. IVERSON.
MACHINE FOR SIZING BARREL HOOPS AND SECURING THE ENDS THEREOF.
APPLICATION FILED MAY 4, 1904.

15 SHEETS—SHEET 11.

INVENTOR
JOHN G. IVERSON
BY
HIS ATTORNEYS

WITNESSES

No. 815,835. PATENTED MAR. 20, 1906.
J. G. IVERSON.
MACHINE FOR SIZING BARREL HOOPS AND SECURING THE ENDS THEREOF.
APPLICATION FILED MAY 4, 1904.
15 SHEETS—SHEET 12.

WITNESSES
INVENTOR
JOHN G. IVERSON
BY Paul & Paul
HIS ATTORNEYS

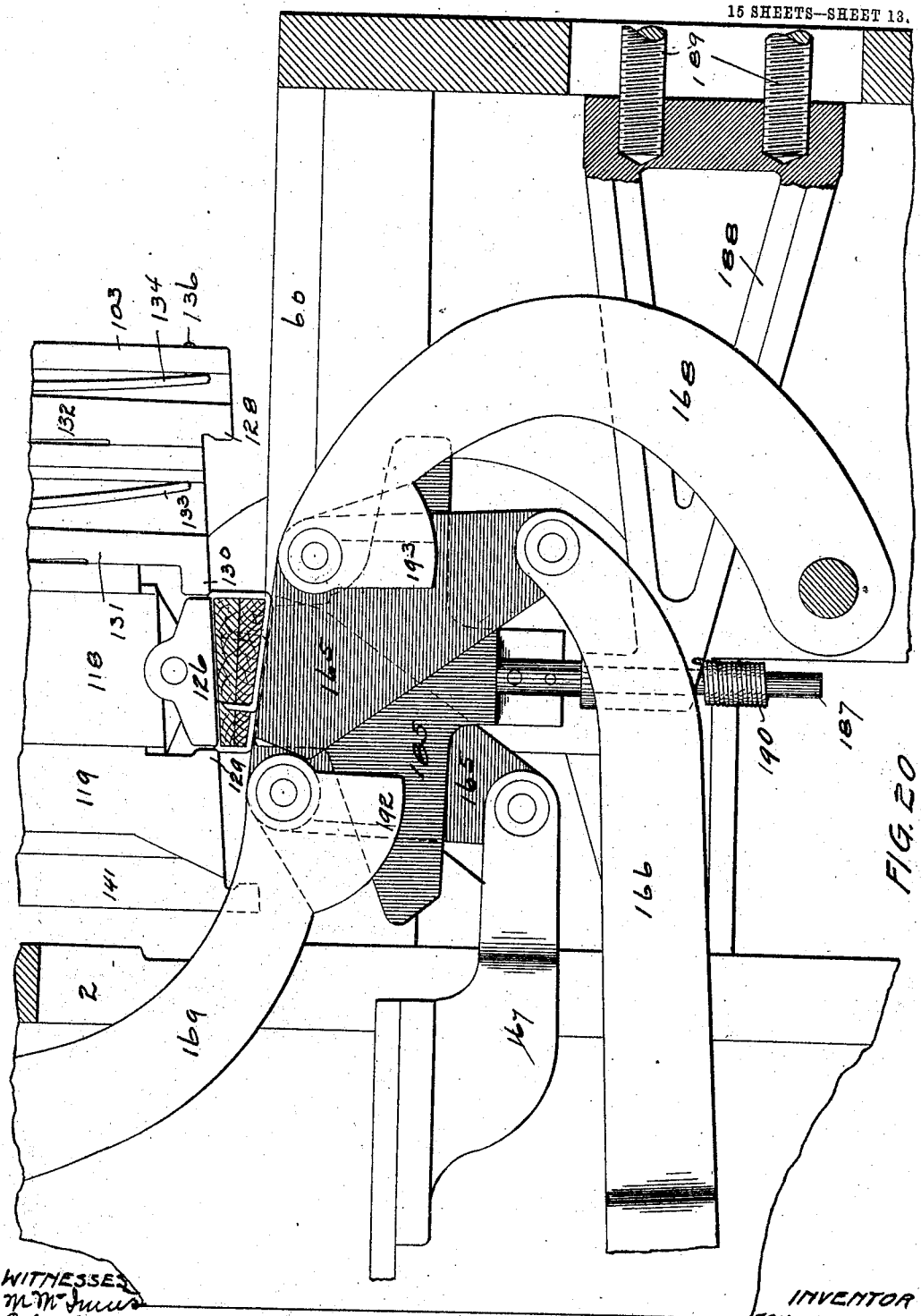

No. 815,835. PATENTED MAR. 20, 1906.
J. G. IVERSON.
MACHINE FOR SIZING BARREL HOOPS AND SECURING THE ENDS THEREOF.
APPLICATION FILED MAY 4, 1904.
15 SHEETS—SHEET 14.
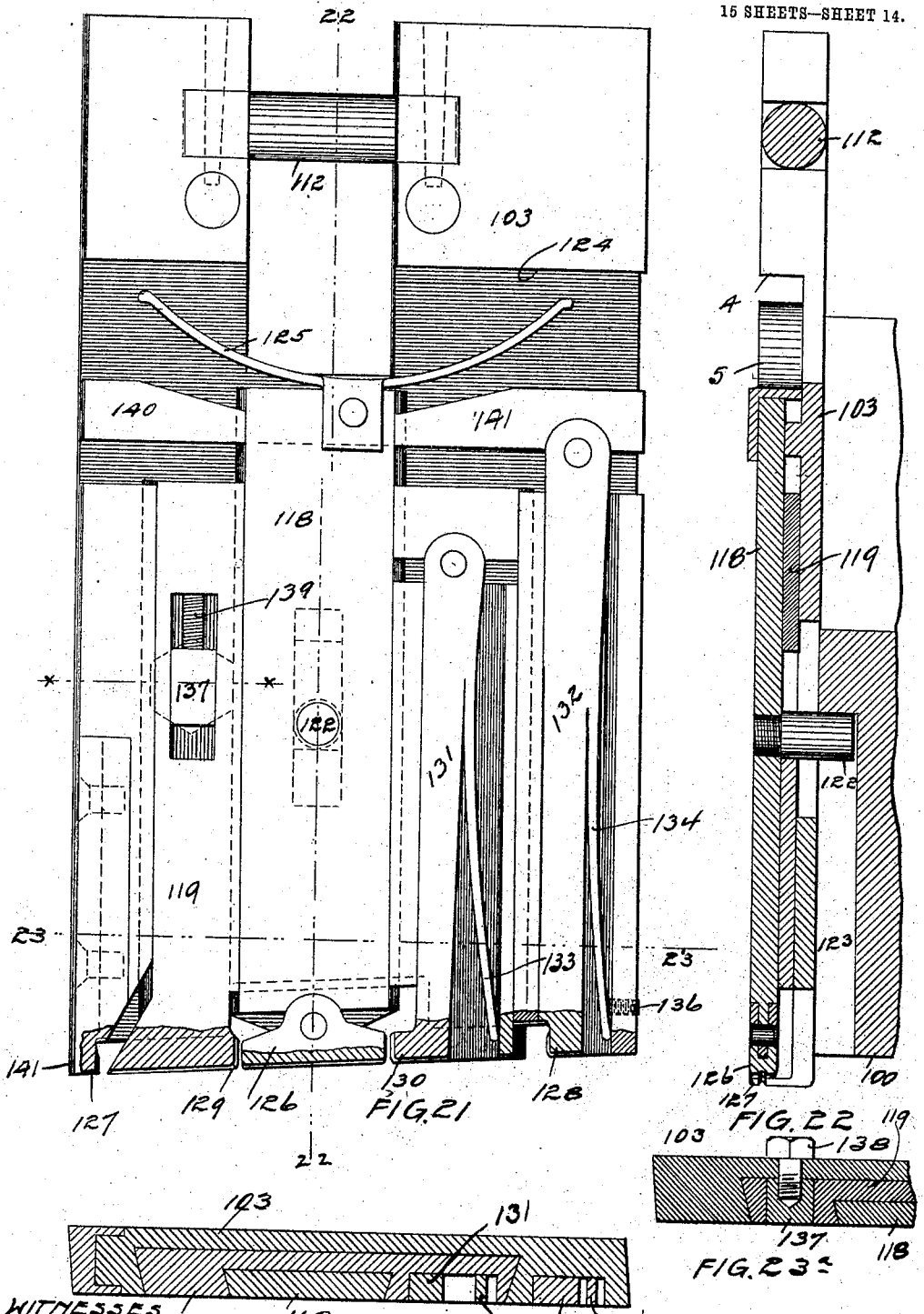
INVENTOR
JOHN G. IVERSON
BY Paul & Paul
HIS ATTORNEYS

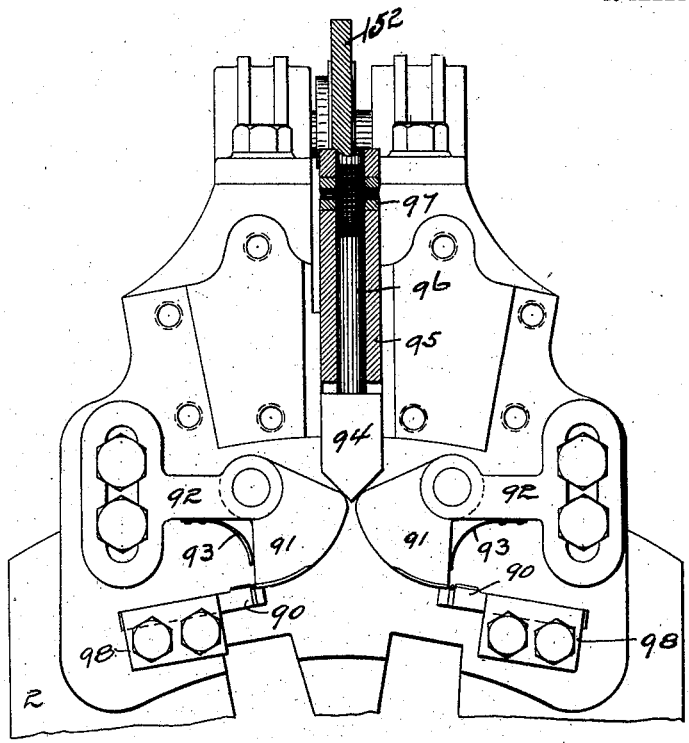
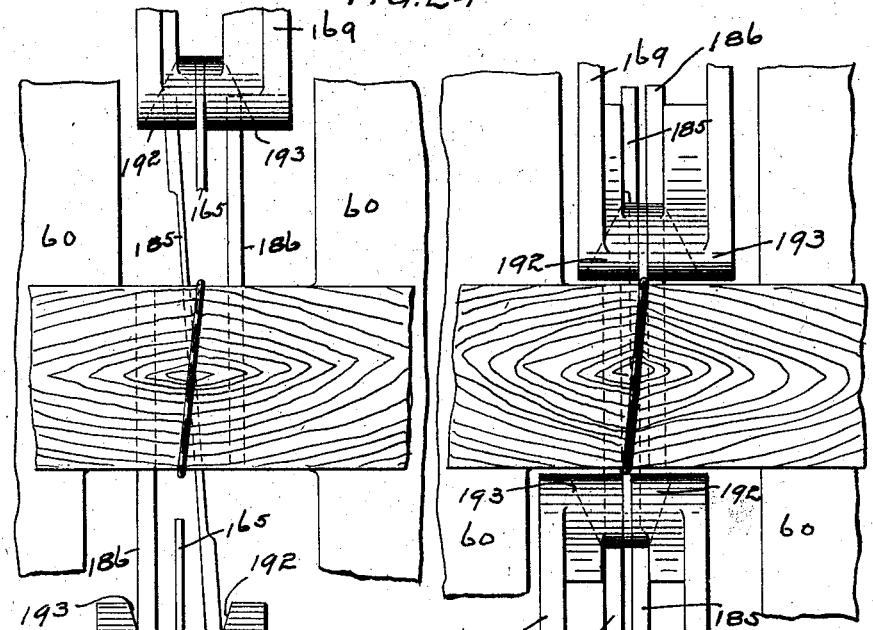

UNITED STATES PATENT OFFICE.

JOHN G. IVERSON, OF MINNEAPOLIS, MINNESOTA, ASSIGNOR TO CHARLES E. COTTRELL, OF MINNEAPOLIS, MINNESOTA.

MACHINE FOR SIZING BARREL-HOOPS AND SECURING THE ENDS THEREOF.

No. 815,835.      Specification of Letters Patent.      Patented March 20, 1906.

Application filed May 4, 1904. Serial No. 206,296.

*To all whom it may concern:*

Be it known that I, JOHN G. IVERSON, of Minneapolis, in the county of Hennepin, State of Minnesota, have invented certain new and useful Improvements in Machines for Sizing Barrel-Hoops and Securing the Ends Thereof, of which the following is a specification.

This invention relates to improvements in machines for sizing barrel-hoops and securing the ends thereof, and particularly to improvements in the machine shown, described, and claimed in Letters Patent of the United States No. 597,701, issued January 18, 1898, upon the application of Clarence O. White.

The objects of the present invention are to provide, first, improved means for starting and stopping the machine; second, improved means for feeding the wire; third, improved means for cutting off the wire; fourth, improved means for forming the staples; fifth, improved means for setting the staples, and, sixth, improved means for expanding the barrel-hoop and holding it while the staples are being set for the purpose of securing the ends of the hoop.

The invention consists generally in the constructions and combinations hereinafter described, and particularly pointed out in the claims.

Figure 2:
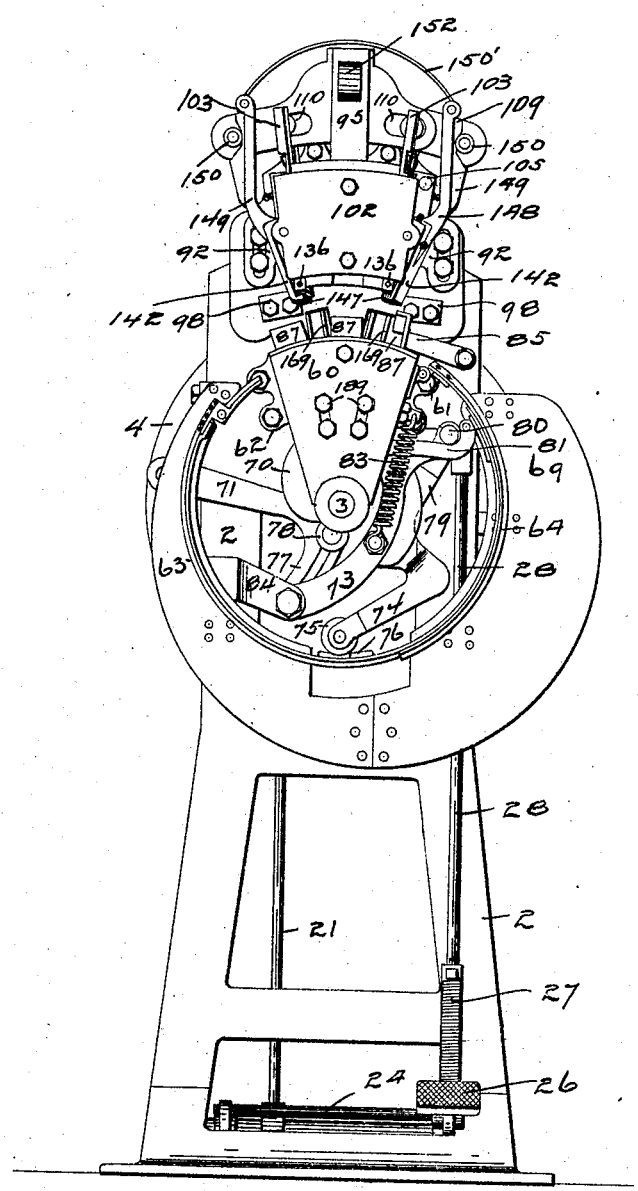
Figure 6:
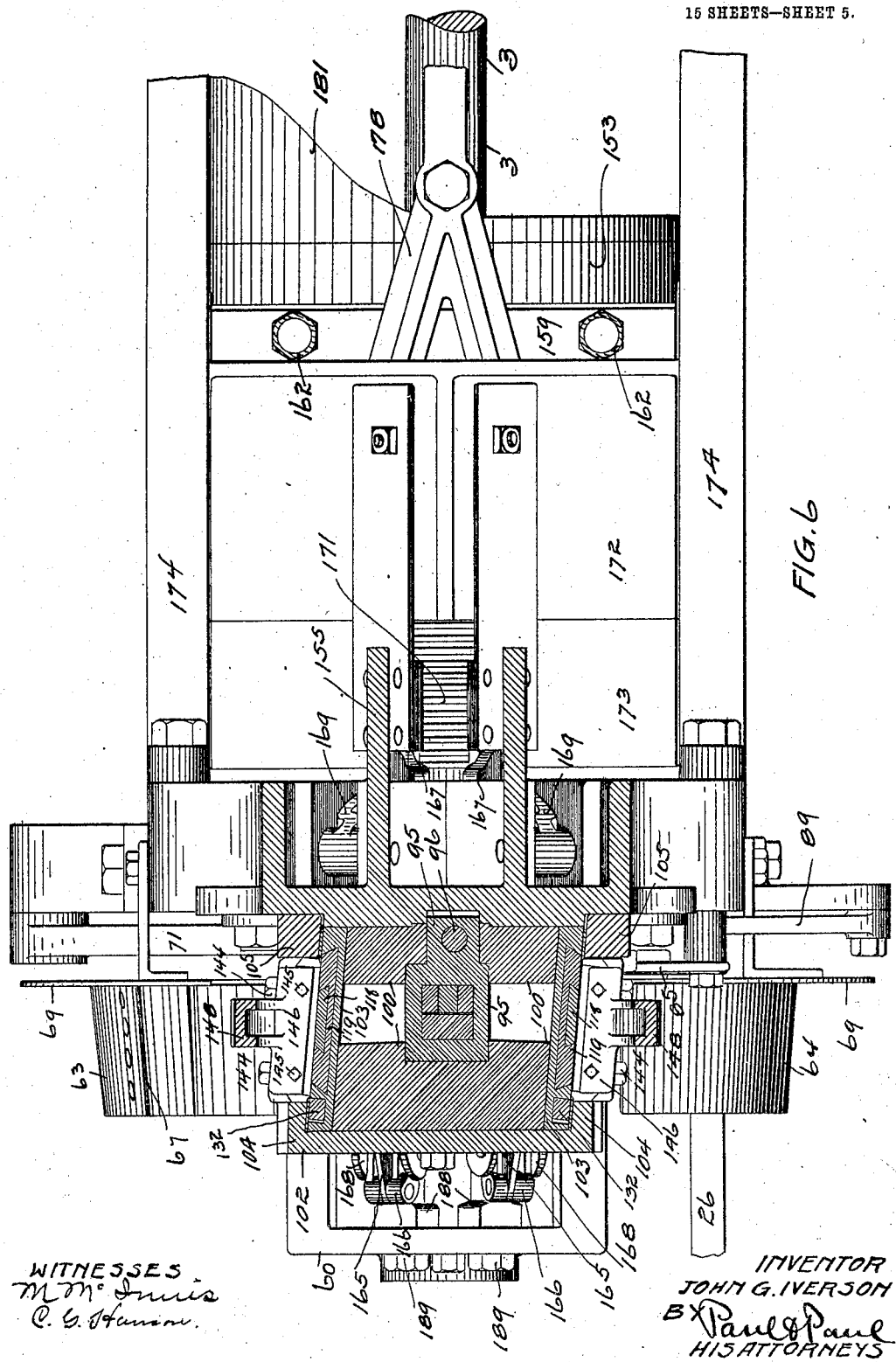
Figure 7:
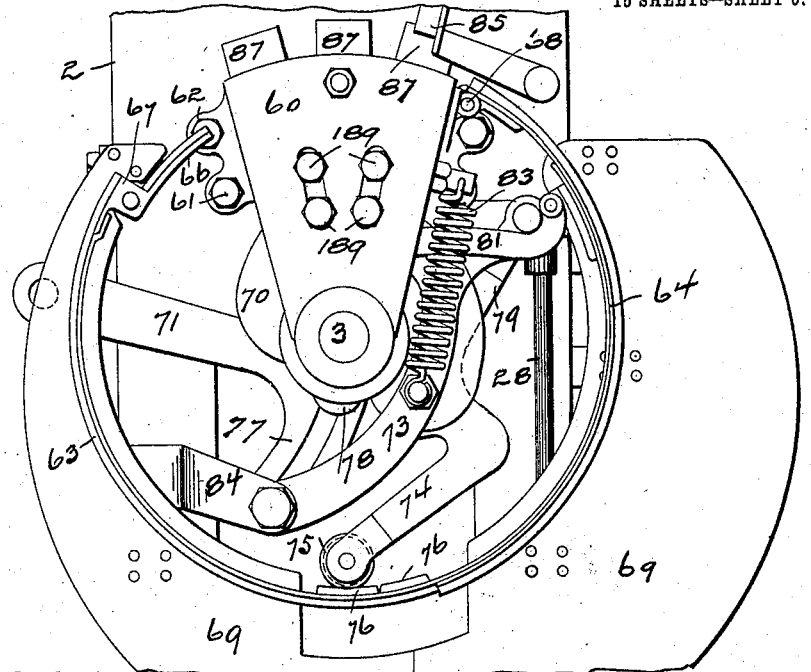
Figure 8:
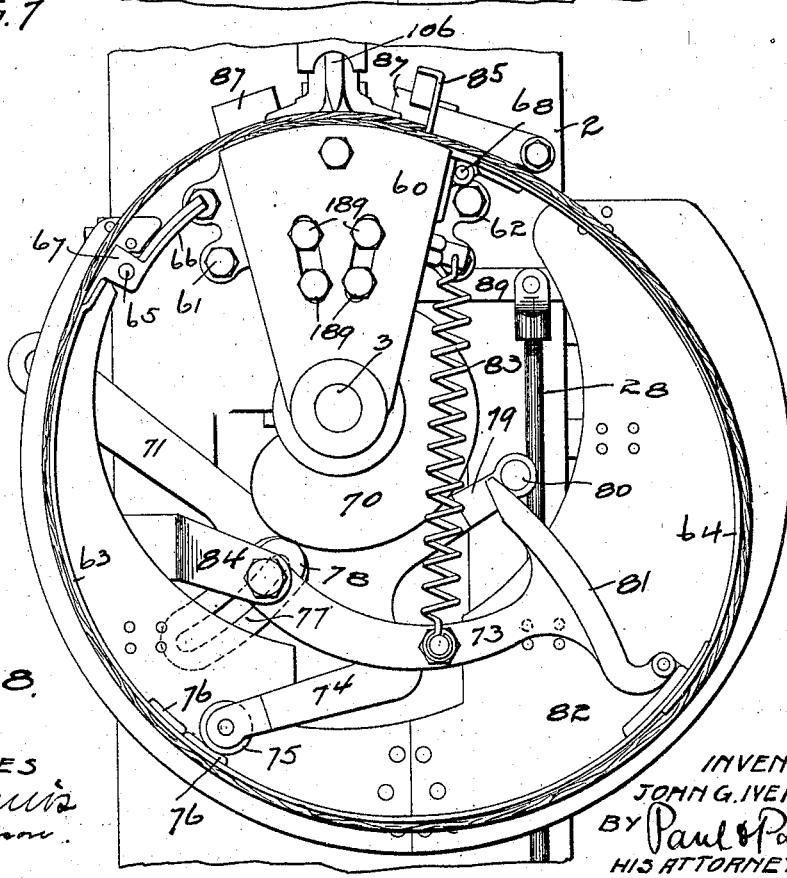
Figure 15:
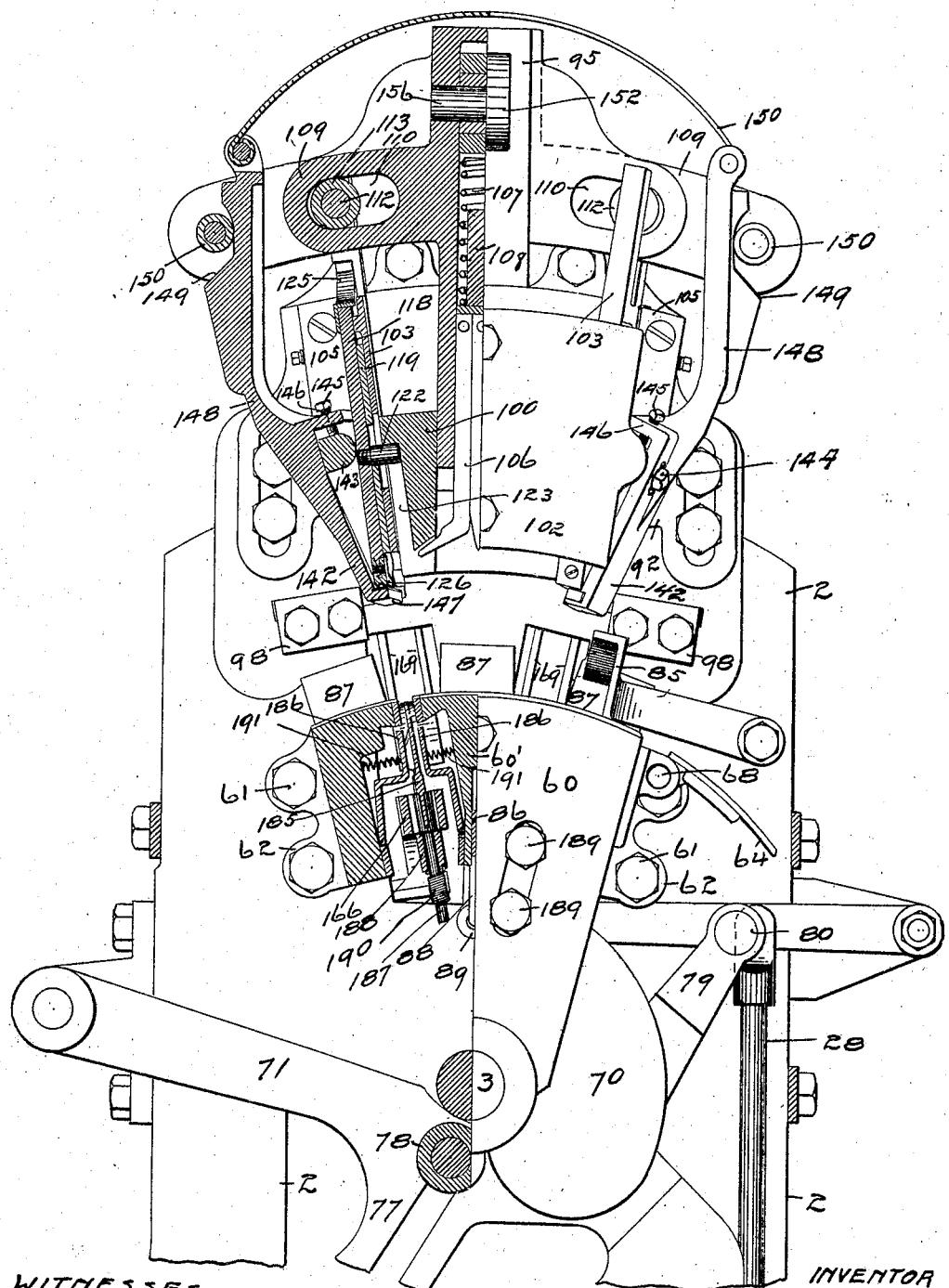
Figure 16:
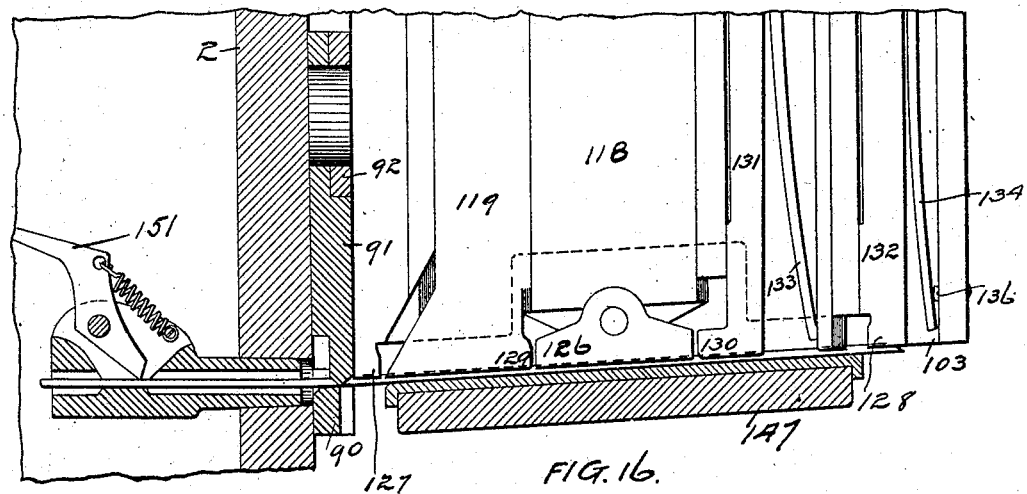
Figure 17:
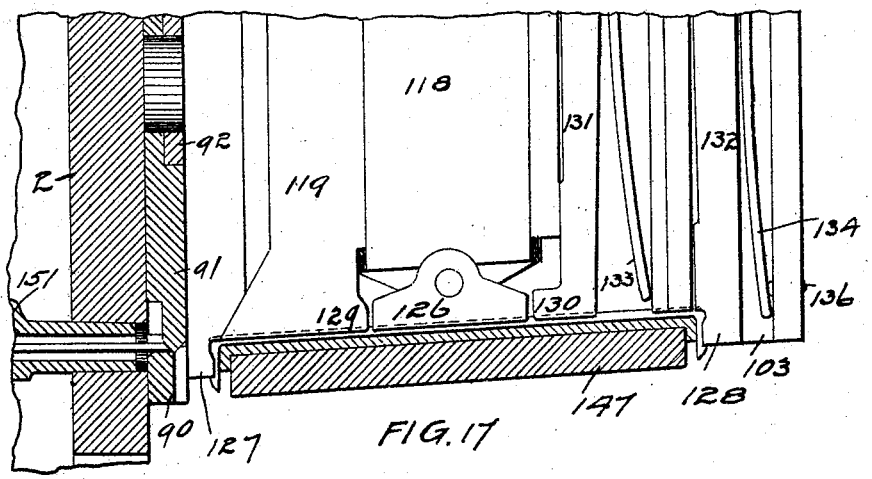
Figure 18:
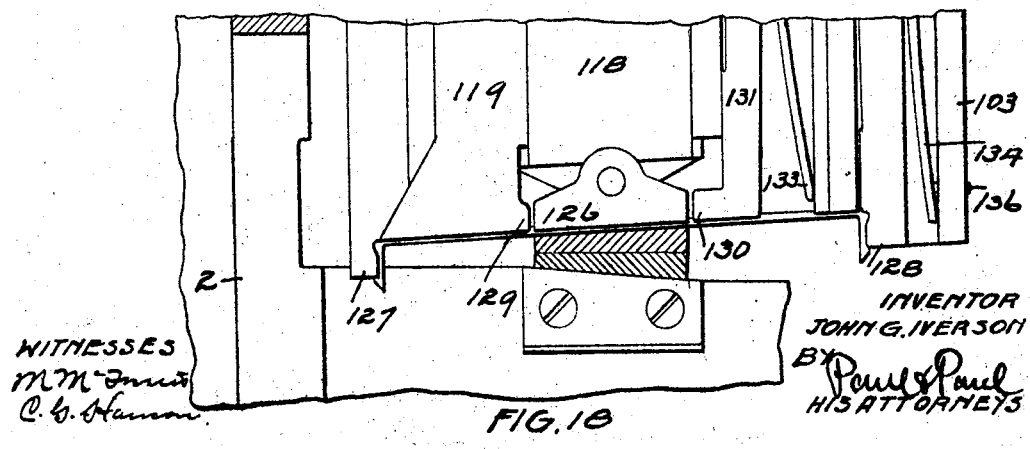
Figure 19:
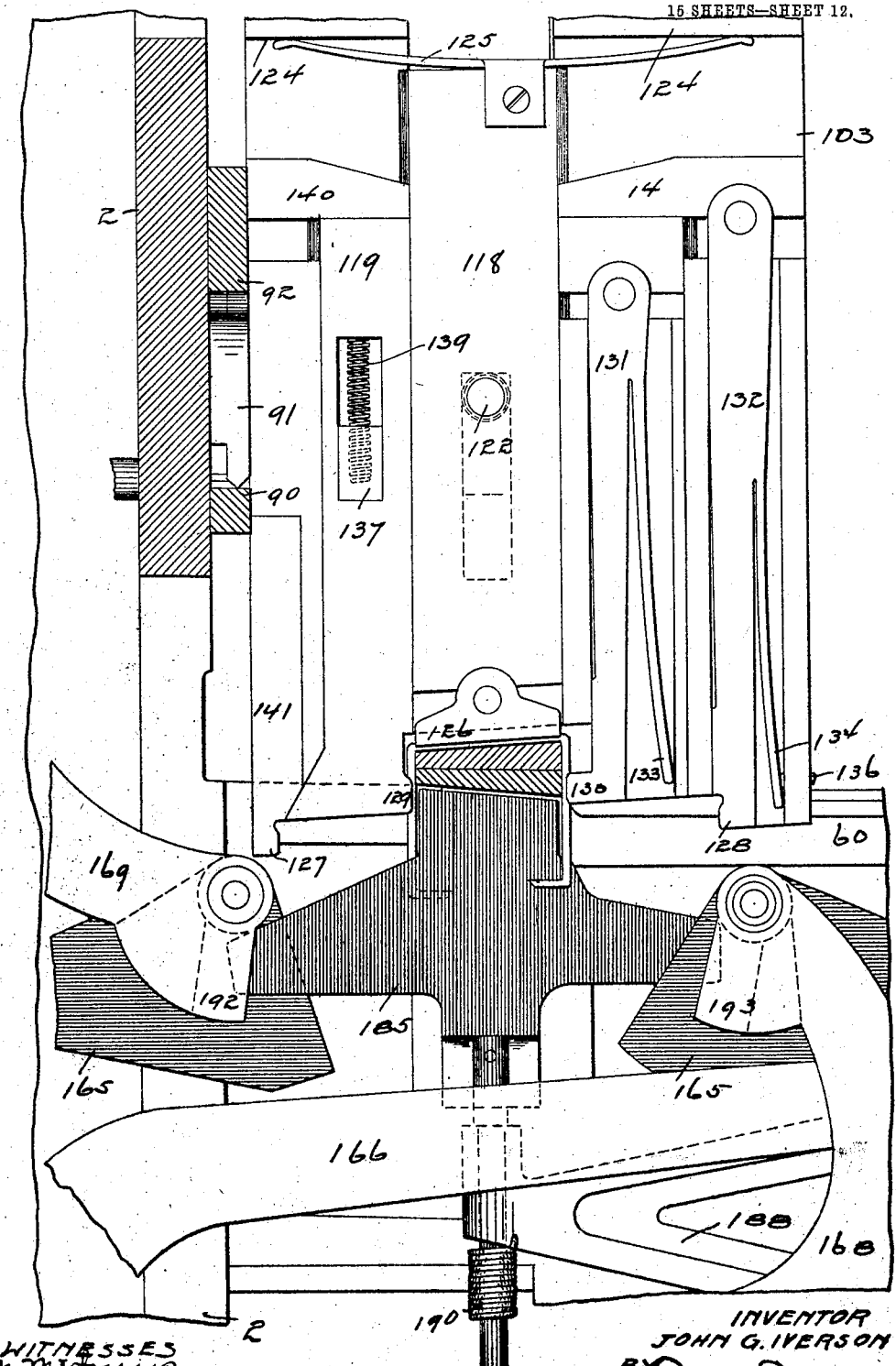

In the accompanying drawings, forming part of this specification, Figure 1 is a side elevation of a machine embodying my invention. Fig. 2 is a front elevation of the same. Fig. 3 is a longitudinal vertical section of the same. Fig. 4 is a transverse vertical section on line 4 4 of Fig. 3 looking in the direction of arrow *a*. Fig. 5 is a transverse vertical section on line 5 5 of Fig. 3 looking in the direction of arrow *b*. Fig. 6 is a horizontal detail section taken on line 6 6 of Fig. 13. Fig. 7 is a front elevation of a portion of the machine, showing the hoop-expander. Fig. 8 is a similar view showing a hoop expanded and in position for having its ends secured. Figs. 9, 10, 11, and 12 are details of the mechanism for connecting and disconnecting the main shaft of the machine and the continuously-rotating driving-pulley. Figs. $10^a$, $10^b$, and $10^c$ are details of the brake-shoe lock. Fig. 13 is a detail longitudinal section. Fig. 14 is a detail section, on an enlarged scale, of the staple forming and setting mechanism, the section being taken on line 14 14 of Fig. 13. Fig. 15 is a front elevation and partial section of the staple forming and setting mechanism, the section being taken on line 15 15 of Fig. 13. Figs. 16, 17, and 18 are details of the staple-forming mechanism. Fig. 19 is a detail of the staple-forming and the staple-setting mechanisms. Fig. 20 is a detail of substantially the same parts shown in Fig. 19 in the position that they occupy when the staple-setting operation is completed. Fig. 21 is a front elevation of the staple-forming plunger. Fig. $21^a$ is a detail of the block that guides the plungers. Fig. 22 is a section on line 22 22 of Fig. 21. Fig. 23 is a section on line 23 23 of Fig. 21. Fig. $23^a$ is a detail section on line *x x* of Fig. 21. Fig. 24 is a front elevation of the wire-cutters. Figs. 25 and 26 are details of the staple-guides.

In all of the drawings, 2 represents the frame of the machine, of any suitable size and construction and formed of any suitable material, but preferably of metal. All of the parts of the machine are mounted on this frame and are supported thereby. A main shaft 3 is mounted in bearings in the frame and extends from the rear end of the machine to the front. This shaft carries the several operating-cams and forms a support for the hoop-expander and for some of the other parts of the mechanism.

*The starting and stopping mechanism.*—Mounted loosely upon the rear end of the shaft 3 is a driving-pulley 4, which is adapted to be driven continuously by a suitable driving-belt. This pulley is provided with the pins 5 5, projecting from its hub and extending, preferably, parallel with the shaft 3. In front of the pulley 4 and fast to the shaft 3 is a cam 6, provided with the cam-surface 7 and upon its edge with the sprocket-teeth 8. The cam 6 is preferably secured to the shaft by a suitable spline or key 6', (see Fig. 9,) and within the hub 10 of the cam is a sliding key 9. A spring 11, arranged in a recess in the hub 10, engages the key 9 and tends to move it toward the pulley 4. This key is released when it is desired to operate the machine, and the end of the key is thrust forward by the spring and is then engaged by one of the pins 5, and thereby the cam and the shaft 3 are caused to rotate with said pulley 4. It is desired, however, to have the cam and the shaft make only a single revolution, and I therefore provide means for releasing and stopping the cam and the shaft at the end of the revolution.

Mounted upon the shaft 3 in front of the cam 6 is a sleeve 12, having a groove that is in line with the groove in the hub of the cam in which the key 9 slides. This key projects from the hub of the cam into the groove in the sleeve 12, and the key slides freely in this groove. The key is provided with an upturned lug 13, and a ring 14 surrounds the sleeve 12, passing over the key 9 inside of the lug 13. The ring 14 is made narrower for a portion of its width, the narrow and wide portions being connected by the incline 15. (See Fig. 12.) The ring 14 is also provided with a projecting lug 16. (See Figs. 10 and 11.) Secured upon the surface of the ring 14 is an adjustable plate 17, having an inclined end 18 and having also a projecting lug 19. This plate is secured in position by means of a cap-screw 20, that passes through a slot in the plate.

A vertically-movable rod 21 is arranged to slide in bearings upon the frame of the machine, and this rod carries at its upper end the pivoted weighted dog 22. The lower end of this rod is connected to an arm 23 upon a shaft 24, and a corresponding arm 25, secured upon this shaft, extends to the forward end of the machine and carries a suitable treadle 26. A spring 25' is connected to the arm 25 and to the frame of the machine, as shown by dotted lines in Fig. 1. This spring tends to raise the end of the arm 25 and depress the free end of the arm 23, and with it the vertically-sliding rod 21. When it is desired to start the machine, the operator places his foot upon the treadle 26, raises the rod 21, and through engagement with the weighted dog 22 the lug 16 turns the ring 14, bringing the narrow part of the ring over the key 9 and permitting said key to be moved by the spring 11 into the path of one of the projecting pins 5 of the driving-pulley 4. This causes the cam to rotate with the pulley to make a complete revolution. It is necessary, however, to stop the cam at the end of the revolution and to lock it in position, so as to prevent any overrunning thereof. For this purpose I provide a brake and a lock by which the cam is stopped at the proper time and by which it is locked until again released by the operator. For this purpose a ring 29 is clamped upon the hub of the cam and secured in position by means of a suitable bolt 30. By loosening the bolt the ring may be adjusted to any desired position. This ring is provided at one side with an arm 31, which is provided at its outer end with a socket containing a suitable brake-block 32, preferably of wood or other suitable material. A lever 33 is pivoted upon the frame of the machine and its upper portion is suitably curved so that the block 32 engages therewith and the curved portion of the lever acts as a brake-shoe. The position of the lever may be adjusted by means of a suitable screw 34.

A pivoted bell-crank lever 35 is arranged upon the frame of the machine, and upon the upper end of the lever 33 is a spring-dog 36, having a slot that is engaged by a pin 37 in the bell-crank lever 35. This dog is secured on the lever 33, and owing to its spring connection it has a slight forward-and-backward movement. This dog has a hook 36', which when the dog has been moved back slightly engages the end of the lever 33 and springs said lever away from the brake-block. One arm of the lever 35 is provided with a roller 38, that rests upon the ring 14. When in its normal position, the dog 36 projects beyond the curved space of the lever a sufficient distance to come in contact with the edge of the arm 31, and thereby to act as a lock for said arm and for the cam 6. (See Fig. 9.) A spring-controlled dog 39 is adapted to engage a notch in the edge of the arm 31 and prevent backward movement thereof.

When it is desired to start the machine, as already explained, the rod 21 is moved upward, turning the ring 14 and moving the plate 17 under the roller 38 on the lever 35. The movement of the ring 14 is limited by the lug 19, which comes in contact with the roller 38. A further movement of the dog causes the hook 36' to engage the end of the lever 33 and spring it away from the block 32, thus releasing the brake. The same movement of the ring 14 releases the key 9 and permits it to be moved by the spring 11 into position to be engaged by one of the pins 5, as already explained. When the shaft 3 begins to rotate, the ring 14 moves with it until the lug 16 strikes a stationery lug 16', which is secured upon the frame of the machine. This moves the plate 17 from beneath the roller 38, and the spring-dog 36 now moves back to its original position, and it will engage the arm 31 again when the shaft 3 completes its revolution. The lever 33 may be adjusted by the screw 34 so as to secure the desired amount of friction between the curved portion of said lever and the block 32. The parts are so timed that the brake is relieved and the cam is released before the key moves forward to be engaged by one of the pins in the driving-wheel.

*The wire-feeding device.*—As this machine preferably forms and sets two staples at a time, it is necessary that the wire-feeding device should be in duplicate, so that two strands of wire may be simultaneously fed to the machine. The frame of the machine is provided with a rearwardly-projecting arm 40, upon each side of which is secured a tube 41, to which the wire from a suitable spool passes to the machine. The arm 40 is provided with the depending lugs 42, to which the tubes 41 are secured, and these lugs are provided with guide-recesses for a reciprocating bar 43. A spring 44 is connected to the upper rear portion of the arm 40, passes through a recess in the forward portion of the arm, and is connected to a lug 45, secured to the sliding bar 43. An adjustable arm 46 is secured upon the arm 43, and this arm carries a roll 47, that engages the face 7 of the cam 6. The spring 44 tends to move the bar 43 backward and holds the roll 47 in contact with the face 7 of the cam 6 at all times. The forward end of the bar 43 is provided with the brackets 48, carrying the depending arms 49. Each of these arms is provided with a suitable gripper 50, adapted to engage the wire and move it forward and then to release it and slide upon the wire while the bar is moved backward. The gripper 50 consists of a recessed plate through which the wire passes, a pivoted dog 51, arranged to engage the wire in the recess, and a spring 52, engaging the end of the dog and adapted to hold the dog in a closed or open position—that is, in position to engage the wire or not engage it, as may be desired. If for any reason it is desired to put in a single staple or for any other reason it is desired to operate the machine without moving the wire, the dog is tipped backward, so that its lower end is away from the bottom of the recessed plate, and it is held in this position by the spring. After each wire passes through its tube 41 it passes through a suitable wire-straightener. I have shown two straighteners, one for each wire, both operated by a belt 53, passing from a pulley 54 upon a shaft 55. The shaft 55 is mounted upon the frame of the machine and carries at its rear end a sprocket-pinion 56, that is engaged by a sprocket-chain 57, driven by the teeth 8 upon the edge of the cam 6. I do not in this application deem it necessary to show and describe in detail the construction of the wire-straighteners, as the straighteners which I prefer to employ and which are shown in outline in this application are shown, described, and claimed in my Letters Patent No. 710,151, dated September 30, 1902.

By the means above described the wire is drawn forward from the spools or reels and each wire is straightened and put in condition for having a staple formed therefrom. The wire passes through suitable cutters and to the staple-forming plunger, so that after the wire is fed forward a suitable length is cut off and is formed into a staple, which is applied to the barrel-hoop. I will later describe the construction of the cutters and the staple forming and setting mechanism. I will first, however, describe the means for expanding and clamping the hoop in position to have the staples applied thereto.

*The hoop expander and clamp.*—At the forward end of the machine I provide means for expanding the hoop and then clamping it with the ends overlapping in the position in which they are to be secured by the staples. As the barrels upon which the hoops are to be used are provided with a bilge, the hoops must be of greater diameter at one edge than at the other, and when they are expanded and clamped they must be brought into proper position to secure this result.

At the forward end of the machine and above the shaft 3 is an anvil 60, which forms a support for the ends of the hoop while the staples are being inserted. This anvil consists of a block, preferably of substantially triangular form, but having a curved upper surface and being secured to the frame of the machine by suitable bolts 61, passing through the lugs or ears 62. The shaft 3 also preferably passes through the lower end of the block and forms an additional support therefor. Pivoted upon the frame of the machine at the sides of the anvil 60 are the spring expander-plates 63 and 64. These plates are each in the form of a segment of a circle, and each plate is shaped to correspond to the bilge of a barrel, or, in other words, one edge of each plate forms part of a circle of greater diameter than that of the other edge. The plate 63 is pivoted at 65 and has a short section 66 projecting beyond the pivot and forming a shoulder 67. The plate 64 is pivoted at 68. The plate 63 extends within the plate 64, so that when in position to receive a barrel-hoop these plates overlap each other, as shown in Fig. 7. Secured upon the front of the machine back of these plates are the sheet-metal plates 69, over which the rear edge of the spring-plates move while the hoop is being expanded. Arranged upon the shaft 3 within the circle of the spring-plates is a suitably-shaped cam 70. Two expanding-levers 71 and 73 are arranged within the expanding-plates, as shown in Figs. 7 and 8. The lever 71 is pivoted at one side of the expander and preferably at the rear of one of the plates 69. This lever has a slotted arm 77, in which is secured a roller 78, that is always in contact with the edge of the cam 70. This roller may be adjusted to any desired position in the slotted arm 77, and thereby the size to which the hoop shall be expanded may be regulated. The lever 71 has also an arm 74, carrying a roller 75, that rests upon one of the blocks 76 upon the inner surface of the expanding-plate 63. The lever 71 also has an arm 79, carrying a roller 80, that is adapted to move over the curved arm 81 upon the lever 73. The lever 73 has pivoted to its end a block 82, that rests against the inner surface of the expanding-plate 63 near its end. A coil-spring 83 is connected to the lever 73 and to a lug upon the side of the anvil 60. The lever 73 is preferably pivoted upon a projecting arm 84, that is suitably secured to the frame of the machine. A pivoted stop 85 is arranged above the anvil 60 and is adapted to rest upon the surface of a hoop applied to the anvil and to the expanding-plates and to form a gage against which one end of the hoop may be brought when the hoop is applied to the anvil and expanded. The other end of the hoop is brought against the shoulder 67 on the expander.

The parts being in the position shown in Figs. 2 and 7 of the drawings, a hoop is applied to the anvil and expander, one end of the hoop being brought against the stop 85 and the other against the stop or shoulder 67. The machine being started, the shaft 3 rotates and the cam 70, turning with said shaft, bears upon the roller 78 upon the lever 71. This roller moving downward causes the arms 74 and 79 of the lever 71 to move downward also. The roller 80 upon the arm 79 travels over the surface 81 of the lever 73 from the position shown in Fig. 7 to that shown in Fig. 8, and all of the parts of the expander move from the position shown in Fig. 7 to that shown in Fig. 8. By this means the hoop is expanded and brought to the desired size, and this size is determined by the position of the roller 78 in the slotted arm 77. The upper surface of the anvil is preferably formed as a separate block 60′, provided with a central slot, and a pivoted dog 86, arranged within the anvil, is adapted to move upward through this slot and to engage the forward edge of the hoop and move it back against the top plates 87, arranged at the rear of the anvil and in the same vertical plane as the plates 69. The dog 86 is connected by a link 88 with a horizontal lever 89, and this lever is connected to the upper end of the rod 28, hereinbefore referred to. The lower end of this rod is connected by a spring 27 with the treadle-arm 25, so that when the operator presses downward upon the treadle 26, after having placed a hoop in position on the machine, the dog 86 is caused to move upward through the slotted anvil and engage the forward edge of the hoop and move said hoop against the stop-plates 87 and clamp it in this position. This action does not, however, prevent the inner end of the hoop from sliding under the outer end while the hoop is being expanded; but it holds the hoop in proper position vertically for having the staples applied thereto. The spring connection between the treadle and the clamping-dog 86 allows also for variations in the width of the hoops. It will be understood that the clamping-dog 86 is brought against the edge of the hoop before the hoop is expanded and that it holds said hoop in proper position against the stop-plates 87 and the plates 69 while the expansion is taking place.

*The wire-cutters.*—The means that I prefer to employ for cutting the wire is shown most clearly in Figs. 13, 16, 17, and 24. For this purpose I provide for each wire a stationary knife or cutter 90 and a pivoted swinging knife or cutter 91. The knives 91 are mounted upon the adjustable brackets 92 and are engaged by the springs 93, and these knives are operated by the adjustable wedge-shaped block 94, arranged within the plunger 95. The block 94 is provided with a stem 96, the upper end of which is screw-threaded and is engaged by a nut 97. This nut is provided with holes in its edge, and it is arranged within a recess in the plunger 95. (See Fig. 13.) By turning this nut the block 94 may be adjusted within the plunger, and therefore the action of the wire-cutters may be regulated. The brackets 92 being adjustable, the cutters 91 may be adjusted in relation to the cutters 90. The cutters 90 are also preferably secured in position by means of the blocks 98, and these cutters are also capable of adjustment. The wire is fed forward and rests upon a shoulder upon the end of each of the cutters 90, (see Fig. 24,) and while held in this position the descent of the plunger causes the cutters 91 to turn upon their pivots and to sever the wire. This operation of the cutters produces a bevel cut upon the upper side of each wire as the wire lies in the machine, (see Fig. 16,) and this brings the straight side of the wire upon the inner side of the staple and upon the inner side of the hook formed in the leg of the staple as it is being inserted in the hoop. (See Figs. 19 and 20.)

*The staple-former and top hoop-clamp.*— The staple-former is similar in its general features to that shown and described in the White patent, No. 597,701. I have, however, made material improvements in its construction, and I use two such staple-formers, so as to form and apply two staples to the hoop at the same time. I also provide a clamp that comes onto the top of the hoop and clamps it firmly while the staples are being applied thereto.

On the front of the machine and above the anvil is a recessed stationary guide-block 100 and a guide-plate 102, which form guides for three plungers—a central plunger 95 (which is the plunger already referred to as operating the movable cutters) and two side plungers 103. (See Fig. 6.) These plungers are given reciprocating movement by means hereinafter described. The block 100 is secured upon the front of the machine-frame, and guideways for the central plunger are formed in this block. The plate 102 has the rearwardly-extending guide-lugs 104, and guide-bars 105 are secured upon the front of the machine-frame. The side plungers (which as a whole are designated by the numeral 103) are arranged to slide between the outer ends of the block 100 and the lugs 104 and bars 105. (See Fig. 6.) The central plunger 95 moves vertically; but the side plungers stand at an angle to the plane of a hoop in position in the machine, and they each move up and down in a line at right angles to a tangent to the surface of the anvil at a point under the center of the plunger. The angular position of the plunger is provided in order that the staple formed thereby may be placed in an angular position across the hoop. (See Figs. 25 and 26.) The central plunger not only controls the movement of the wire-cutters, but it also carries the top hoop-clamp 106, consisting of three bars arranged in a central recess in said plunger and provided with the spring 107, which surrounds a rod 108, to which the bars are secured and which causes the ends of said bars to bear on the hoop with a yielding pressure. The center bar is straight and pointed at its lower end, while each of the other bars has an outturned point, and these points engage the upper surface of the hoop when in position in the machine and prevent its collapsing while the staples are being applied. The spring acting on the bars will yield sufficiently to permit the clamp to accommodate itself to any thickness of hoop.

The central plunger 95 is provided with the outwardly-projecting arms 109, provided with the slots 110 and at their outer ends with the rollers 111. These arms project through openings in the upper ends of the side plungers, (see Fig. 21ª,) and a pin 112, surrounded by a roller 113, passes through each of the slots 110. (See Fig. 15.) By this means each of the side plungers is caused to move down and up with the central plunger. Each of the side plungers, like the single plunger shown and described in the White patent, No. 597,701, above referred to, is formed in three parts—an outer part 103, (see Figs. 6, 21, and 23,) a central part 118, (see Figs. 6, 16, and 23,) and an intermediate part 119. (See Figs. 6, 21, and 23.) The outer part of the plunger is centrally recessed, and within this recess is placed the intermediate part. The intermediate part is also centrally recessed, and within it is placed the central part. The outer part of the plunger is provided at the top with a recess, and a roller 113 extends across this recess and passes through a recess 110 in the projecting arm 109 of the central plunger. (See Figs. 14 and 15.) A pin 112 has its ends secured in the plunger and forms a support for the roller 113. The central part 118 of the plunger is provided with a pin 122, that projects through slots in the other two portions of the plunger and into a groove 123 in the block 100. (See Fig. 22.) The upper part of the outer portion of the plunger is recessed and has a shoulder 124, that projects over the other parts of the plunger, and a spring 125, secured upon the central part 118 of the plunger, comes under this shoulder. The lower end of the central part 118 of the plunger is provided with the hinged head 126, and a suitable groove is formed in the lower end of each portion of the plunger, and these grooves coincide when the plunger is in position to have the wire passed beneath it. (See Figs. 21 and 22.) The outer and intermediate portions of the plunger are provided with the staple-forming shoulders 127, 128, 129, and 130, and the shoulders 128 and 130 are each formed upon the lower end of a hinged bar 131 and 132, each of these bars being set into a recess in the portion of the plunger of which it forms a part. (See Figs. 21 and 23.) Suitable springs 133 and 134 are connected to the bars 131 and 132 and press said bars toward the center of the plunger and hold them with a yielding pressure against the walls of the recesses in which they are located. A set-screw 136 may be provided for adjusting the tension of the spring 134 and limiting the movement of the bar 132. A slot is formed in the intermediate portion 119 of the plunger, and a block 137 is arranged in this slot and is secured to the outer part of the plunger by means of a bolt 138. (See Figs. 21 and 23ª.) The head of this bolt slides in a vertical groove in the block 100. (See Fig. 21ª.) A spring 139 is arranged in the recess above the block 137 and holds the part 119 of the plunger normally elevated, so that the bottom of the recess is against the bottom of the block. (See Fig. 19.) The outer portion of the plunger is also provided with the blocks 140 and 141, which are arranged above the top of the intermediate portion 119 of the plunger and are adapted to come in contact therewith as the plunger descends. The shoulder 127 at one edge of the outer part of the plunger is preferably formed upon a removable steel block 141. (See Figs. 21 and 23.) This block may be removed and renewed whenever it is necessary.

I also provide means for holding the wire against the bottom of the plunger after it is cut off and while the first bends are being formed therein. This wire-holder consists of a pivotally-supported plate 142 of sufficient width to extend under the intermediate and central parts 119 and 118 of the plunger. (See Figs. 15, 16, and 17.) This plate is secured to an axis 143, mounted in stationary bearings in the parts 104 and 105. (See Figs. 6 and 15.) The plate 142 is secured to the axis 143 by a screw 144 passing through a slot in the plate and engaging a threaded hole in the axis. Two or more of these screws may be provided. The plate is also provided with the inwardly-projecting lug 146, through which passes the screws 145, that bear upon the upper surface of the axis 143. By means of these screws the plate 142 may be adjusted, and the lip 147 upon its lower edge may be brought in the desired relation to the lower end of the plunger. An arm 148 is secured to or formed integrally with the plate 142 and extends upward and is provided with the incline 149, and rollers 150 on the outer ends of the arms 109 on the central plunger are adapted to engage this incline as the plunger descends, and thereby to turn the plates on their axes and move the lips 147 from beneath the end of the plunger. The upper ends of the arms 148 are preferably connected by a spring 150'.

The operation of this part of the machine is as follows: The wire is fed forward beneath the plunger and above the lip 147 on the wire-holder 142. (See Fig. 16.) Any backward movement of the wire is prevented by the spring-controlled dog 151. When a proper length of wire has been brought beneath the plunger, the central plunger begins to descend, and the first operation thereof causes the wire-cutters to operate and sever the wire. The wire is now held in position by the lip 147 of the wire-holder. The central and intermediate portions of the staple-forming plunger are held by the wire-holder while the outer portion of the plunger moves downward, and the shoulders 127 and 128 form the first bends in the wire, bringing the ends of the wire into the position shown in Figs. 17 and 18 of the drawings and forming the hooks which are to be embedded in the hoop. The further movement of the central plunger through the means already described causes the wire-holder to be moved from under the ends of the intermediate and central parts of the staple-forming plunger, and the wire will now be held between the shoulders 127 and 128, sufficient pressure being exerted by the spring 134 to hold the wire in position. The parts remain in this position until the wire and the central part of the plunger come in contact with the surface of the hoop, (see Fig. 18,) and a further movement of the plunger causes the wire to be bent down at the edges of the hoop and turned into the position shown in Fig. 19 of the drawings. These bends in the wire are formed by the shoulders 129 and 130 on the part 119 of the plunger. The spring connected with the bar 131 permits the shoulder 130 to accommodate itself to any variation in the width of the hoop.

For the purpose of operating the plunger I provide a grooved cam 153 upon the shaft 3, a pivoted lever 152, that is connected to the upper end of the plunger 95, and suitable connections between this lever and said grooved cam. (See Fig. 3.) The lever 152 is slotted and mounted upon a pin or stud 154, which is arranged in bearings on the brackets 155 upon the frame of the machine, and the forward end of the lever is connected to the central plunger 95 by means of a suitable pin 156. (See Figs. 3 and 15.) The rear end of the lever 152 is connected to a cross-head 157 by means of a suitable pin 158. (See Figs. 3 and 4.) A second cross-head 159 is arranged above the shaft 3, and its ends are arranged in suitable recesses 160, provided between the depending lugs 161. (See Figs. 1 and 4.) Rods 162 connect the cross-head 159 with the cross-head 157. The cam 153 is provided with a suitable groove 163, so formed as to raise the rear end of the lever 152, and thereby at the proper time to depress the forward end of the lever and operate the wire-cutters, the top hoop-clamp, and the staple-forming plungers.

The spring in the central plunger provides for a yielding pressure of the top hoop-clamp upon the hoop, thereby allowing for variations in the thickness of hoops. The spring above the central part 118 of the plunger allows also for variations in thickness of the hoops. The pivoted head 126 upon this part of the plunger allows for variations in the angle of the hoop. The spring 139 in the recess in the intermediate part of the plunger 119 forms a yielding connection between this part of the plunger and the outer part 117. The spring connected with the pivoted bar 131 allows for variations in the width of the hoops, and the spring 134, connected to the bar 132, provides means for holding the partly-formed staple after the wire-holder extending beneath the plunger has been withdrawn.

*The staple-setting mechanism.*—When the staple has been formed and brought into the position shown in Fig. 19 of the drawings, it becomes necessary to bend the lower portions inward and set the hooks into the wood, bringing the parts into the position shown in Fig. 20 of the drawings. As already stated, the staple is placed in an angular position across the hoop, as shown in Figs. 25 and 26 of the drawings, so that when the legs of the staple are bent inward they pass each other, as shown in Fig. 20. In the White patent, No. 597,701, to which reference has herein been made, sliding clencher-bars were provided for engaging the bends in the wire staples and forcing the points of the staple into the hoop. Instead of using sliding clencher-bars I provide the pivoted clencher-bars or plates 165. These plates are pivotally connected to the oppositely-sliding operating-bars 166 and 167, and each plate is also of substantially triangular form, and one of said plates is pivotally connected to the outwardly-projecting pivoted swinging arm 168 and the other to the downwardly-projecting pivoted swinging arm 169. (See Fig. 13.) The operating-bars 166 and 167 are connected to the sliding rack-bars 170 and 171. (See Fig. 3.) These rack-bars are provided with cross-heads 172 and 173, that engage horizontal grooves or ways in the side plates 174 of the frame of the machine. (See Fig. 5.) A cross-shaft 176 is also mounted in these plates and carries a pinion 177, that engages both of the rack-bars 170 and 171. Connected to the rack-bar 170 is an operating-bar 178, the rear end of which extends through a guide-slot 179 in the frame of the machine. (See Fig. 3.)

This bar carries a roller 180, which engages a cam 181, secured to or formed integrally with the cam 153. A spring 182 is connected to the rack-bar 170 and also to the frame of the machine. (See Fig. 3.) The operation of this part of the machine is as follows: The clencher-plates stand normally in the position shown in Fig. 19 of the drawings. After the staple has been formed and the parts brought into the position shown in Fig. 19 the bar 178 is moved backward by the cam 181 and the operating-bars 166 and 167 are moved in opposite directions. The clencher-plates are moved toward each other, turning on their pivots, while at the same time the arms 168 and 169 swing upon their pivots. This causes the edges of the plates to move toward each other and at the same time to swing upward, thereby engaging the legs of the staple, turning said legs inward and upward and forcing the points or hooks of the staples into the wood, completing the operation and bringing the parts into the position shown in Fig. 20 of the drawings. After the parts are brought into this positon and the staples are properly secured to the hoop a further rotation of the cam 181 permits the reverse movement of the clencher-plates and their operating-bars. The pivoting of the clencher-plates upon the swinging arms and the connecting of said plates with their operating-bars by pivots I find to be a very important improvement, as the motion given to each plate insures the proper turning inward of the leg of the staple and the embedding of the hook on the staple in the wood. It is also important that the wire be cut so that the bevel of the cut is toward the outside of the staple and the straight part of the point on the inside of the staple, so that when the hooks are turned inward the straight sides of the points are toward the legs of the staples, as shown in Fig. 20 of the drawings. This makes it impossible for the hooks to bend out of position as they are being inserted in the wood.

*The staple-guides.*—I find that it is desirable to provide guides for the legs of the staple, which bring them into proper position to be engaged by the clencher-plates and guide them while they are being bent inward and the hooks on the legs are being embedded in the wood. For this purpose I provide the central guide 185 and two side guides 186. (See Figs. 13, 14, 15, 19, 20, 25, and 26.) The central guide 185 is pivotally mounted by means of a pin or stud 187 upon a bracket 188, that is secured to the frame of the machine by suitable screws 189, which permit of the adjustment of said bracket and of the guide. The guide is arranged to swing freely upon its pivotal support, but is normally held in a position diagonal to the hoop (see Fig. 25) by means of a spring 190, that engages the stem of the guide and has its end secured to the bracket in which this stem is mounted. (See Fig. 15.) This spring holds the central guide in the diagonal position shown in Fig. 25, so that when the wire is fed into the machine and the staple is formed in the manner already described one leg of the staple is on one side of the guide and the other leg is on the other side. (See Fig. 25.) The side guides 186 are each hinged to the side wall of the recess in the anvil, in which said guides are located. Springs 191, connected to the guides 186 and to the walls of the recess, tend to pull said guides toward said walls and move them away from the central guide 185. The ends of the arms 168 and 169 are provided with the cams 192 and 193. (See Figs. 13, 19, 20, and 25.) These parts stand in the position shown in Fig. 25 while the wire is fed into the machine, is cut off, and the staple is formed and the parts brought into the position shown in Fig. 19 of the drawings. Then as the clencher bars or plates are advanced to finish the setting of the staple the cams 192 swing the center guide from the position shown in Fig. 25 to that shown in Fig. 26, so that one side of the guide bears against one side of one leg of the staple and the other side of the guide bears against the opposite side of the other leg of the staple. The cams 193 engage the guides 186 and turn said plates inward against the tension of the springs 191 and bring said guides against the other surfaces of the legs of the staple. The guides will now occupy the position indicated by dotted and full lines in Fig. 26, and the staple-legs will be compelled to move between said guides. The clencher-plates as they move forward pass between the guides, and it is impossible for the wire to get out of the path fixed for it between said guides, and hence there is no difficulty in forcing the legs of the staple inward and embedding the hooks in the wood of the hoop, such as is likely to occur where no means are provided for guiding the movements of the staple-legs. When the staple is formed, it frequently happens that it will not lie across the hoop at the exact angle to bring its legs in the line of the clencher-plates. The guides will engage the legs of the staple and adjust them to the proper position to be engaged by the clencher-plates.

It will be understood that I employ two sets of staple forming and setting mechanisms, so that two staples are formed and set simultaneously. This, however, is not essential to the operation of my invention, as I may, if preferred, construct the machine with a single staple forming and setting mechanism. It will also be understood that the staple forming and setting mechanisms are all preferably arranged upon lines converging toward the center of the shaft 3, the upper surface of the anvil being a portion of a circle with this shaft as a center. (See Fig. 14.)

The mechanism herein shown and described very rapidly performs the operation of expanding the hoop and bringing it to the desired size and then forming and setting the staples, and thereby fastening the ends of the hoop. I do not, however, limit myself to the details of the mechanism herein shown and described, as the same may be varied in many particulars without departing from my invention.

I claim as my invention—

1. The combination, with the pivoted hoop-expanding spring-plates, of the pivoted levers for operating said plates, and the rotatable cam engaging said levers.

2. The combination, with the anvil-block, of the hoop-expanding spring-plates, the pivoted levers for operating said plates, and the rotatable cam engaging said levers.

3. The combination, with the spring expanding-plates, of the pivoted levers 71 and 73 engaging said plates, the shaft, and the cam 70 upon said shaft for operating said levers.

4. The combination, with the anvil, of the spring expanding-plates pivotally mounted upon opposite sides of said anvil and arranged to overlap each other, the pivoted levers engaging said plates and the operating-cam for engaging and moving said levers.

5. The combination, with the anvil 60, of the spring expanding-plates 63 and 64 pivotally mounted at the sides of said anvil and the pivoted gage 85 arranged above said anvil.

6. The combination, with the anvil and the hoop-expander, of the stops 67 and 85 for the ends of the hoop.

7. The combination, with the anvil, of the pivoted spring expander-plates, one of said plates being provided with the stop or shoulder 67.

8. The combination, with the anvil and the hoop-expander, of the hoop-clamp consisting of the pointed bars arranged to engage the hoop with a yielding pressure.

9. The combination, with the anvil and the hoop-expander, of the plunger arranged above said anvil and provided with the pointed bars arranged to engage the hoop placed upon said anvil.

10. The combination, with the anvil and the hoop-expander, of the plunger arranged above said anvil, and of the hoop-clamp consisting of three bars pointed at their lower ends, the outer bars having their points outturned, for the purpose set forth.

11. The combination, with the anvil and hoop-expander, of three plungers arranged above said anvil, the central plunger being provided with a hoop-clamp and each of the other plungers being provided with a staple forming and setting mechanism.

12. The combination, with means for clamping the overlapped ends of the hoop, of means for feeding the wire, means for cutting the wire diagonally, means for forming a staple from the wire with the beveled or inclined surfaces at the ends of the wire at the outer sides of the staple-legs, means for bending said staple about the overlapped ends of the hoop, and means for inserting the ends of the staple in the hoop.

13. The combination, with means for clamping the overlapped ends of a hoop, of a wire-feed, a cutter for severing a suitable length of wire with an inclined or diagonal cut, means for forming bends in the ends of the wire with the inclined faces of the ends of the wire outward, means for bending the severed length of wire over the overlapped ends of the hoop, and means for embedding the bent ends of the wire in the hoop.

14. The combination, with means for clamping the overlapped ends of a hoop, of a suitable wire-feed, a wire-cutter, and a three-part plunger, the central part of which is provided with a pivoted head, for the purpose set forth.

15. The combination, with means for clamping the overlapped ends of a hoop, of a suitable wire-feed, a three-part plunger, the outer part of said plunger being provided with the shoulder 127 and with the spring-controlled bar 132 having the shoulder 128, for the purpose set forth.

16. The combination, with means for clamping the overlapped ends of a hoop, of a suitable wire-feed, a wire-cutter, and a three-part plunger having forming-shoulders or dies arranged upon yielding supports.

17. The combination, with means for clamping the overlapped ends of a hoop, of a suitable wire-feed, a wire-cutter, and a three-part plunger, the central part of which is provided with a pivoted head, and the other parts with yielding forming shoulders or dies.

18. The combination, with means for clamping the overlapped ends of a hoop, and means for forming a staple with its legs at opposite sides of said hoop, of the pivotally-supported guide-plate, the pivotally-supported clencher-plates, and means for operating said plates, for the purpose set forth.

19. The combination, with means for clamping the overlapped ends of a hoop, of a pivotally-supported staple-guide, means for feeding a wire and forming a staple therefrom with its legs upon opposite sides of said staple-guide, and means for embedding the ends of the staple in the hoop.

20. The combination, with means for clamping the overlapped ends of a hoop, of a wire-feed, a cutter for severing a suitable length of wire, means for forming bends in the ends of the wire, means for bending the severed lengths of wire about the overlapped ends of the hoop, means for embedding the bent ends of the wire in the hoop, and a pivotally-supported guide-plate for guiding the wire while it is being bent around the hoop.

21. The combination, with means for clamping the overlapped ends of the hoop, of the wire-feed, the plunger for forming bends in the ends of the wire and bending the same around the hoop, the clencher-plates for embedding the bent ends of the wire in the hoop, a pivotally-supported guide-plate for guiding the wire while being bent around the hoop, and means for operating said plunger and clencher-plates.

22. The combination, with the clencher-plates, of the pivotally-supported guide-plate 185, and the cams for moving said guide-plate.

23. The combination, with the clencher-plates and the swinging arms to which said plates are pivoted, said arms being provided with suitable cams, of the pivoted guide-plate 185 adapted to be engaged by said cams, for the purpose set forth.

24. The combination, with the clencher-plates, of the central pivoted guide 185 and the hinged side guides 186, and the cams for controlling said guides, for the purpose set forth.

25. The combination, with the clencher-plates and means for operating the same, of a hinged guide-plate 186 and the cam for operating said guide-plate, for the purpose set forth.

In witness whereof I have hereunto set my hand this 14th day of April, 1904.

JOHN G. IVERSON.

In presence of—
  A. C. PAUL,
  C. G. HANSON.